Aug. 6, 1963

N. W. FELDMAN 3,100,245

KEYSENDER FREQUENCY SELECTOR

Filed Nov. 3. 1960

2 Sheets-Sheet 1

INVENTOR,
NATHAN W. FELDMAN

BY Jack H. Linscott

ATTORNEY.

Aug. 6, 1963 N. W. FELDMAN 3,100,245

KEYSENDER FREQUENCY SELECTOR

Filed Nov. 3, 1960 2 Sheets-Sheet 2

INVENTOR,
NATHAN W. FELDMAN
BY Jack H. Linscott
ATTORNEY.

United States Patent Office
3,100,245
Patented Aug. 6, 1963

3,100,245

KEYSENDER FREQUENCY SELECTOR

Nathan W. Feldman, Long Branch, N.J., assignor to the United States of America as represented by the Secretary of the Army Filed Nov. 3, 1960, Ser. No. 67,144
4 Claims. (Cl. 179—90)
(Granted under Title 35, U.S. Code (1952), sec. 266)

The invention described herein may be manufactured and used by or for the Government for governmental purposes, without the payment of any royalty thereon.

This invention relates to switching systems and particularly to keysender telephone switching systems. More particularly this invention relates to the analog type of automatic switching for communication systems.

The digital or pulse systems for switchboard supervision or control, that are used for local telephone dialing, are mechanically simple in concept, but they are not entirely satisfactory for overall use because of the difficulty of transmitting pulses over transmission lines or radio links. This factor led to the use of analog data for transmitting the pulse information; the digital pulses being converted into analog tone signals for transmission and then reconverted into digital pulses for the actual switchig at the receiving end.

Ultimately the keysenders were developed to provide entirely automatic analog type of switching for communication systems. These keysenders develop voice frequencies instead of sequential D.C. pulses. The keysenders eliminate the need for converters and provide a faster, more versatile, more accurate, and more foolproof system that is mechanically simpler for an operator to use.

However, while the keysending systems are simpler from the operator's standpoint, the systems so far available are highly complicated mechanical and electrical devices. Several combinations of switching functions are invariably necessary and must be accomplished simultaneously. The mechanical linkages necessary to select the various combinations of switches are complicated and the manufacturing tolerances for the mechanical parts together with the inherent wear and other troubles result in delayed operation of one or more of the functions. The electromechanical elements are even more complicated and include multi-element and multi-contact switch structures, which are also a serious potential source of failures.

It is therefore an object of this invention to provide an improved keysender, telephone, switching system.

It is a further object of this invention to provide an improved keysender that has only a single switch for each of the combinations of analog data that is desired to transmit.

It is a further object of this invention to provide an improved key-sending system that has only one moving part for each of the keys.

It is a further object of this invention to provide an improved key-sending system that replaces most of its mechanical functions with the more reliable solid-state switching devices.

It is a further object of this invention to provide an improved keysending system that is lighter in weight, more compact in structure, more positive in operation, and cheaper to make.

These and other objects of this invention are realized by using a plurality of back-biased diodes in combination with each of the keys of the keysender. Each of the diodes is coupled to one of the circuits that performs a function necessary for a particular keying, and the diode serves to disconnect the source of energy from that circuit and to decouple that circuit from the other circuits and from the common output until the particular function of that circuit is called for by the keying. The keying disconnects a back-biasing voltage and connects a forward-biasing voltage to the diodes associated with any particular key. This connects the desired circuits together and to the source of operating voltage to provide the desired function.

This device will be better understood and other and further objects of this invention will become apparent from the following specification and the drawings, of which:

Figure 1:
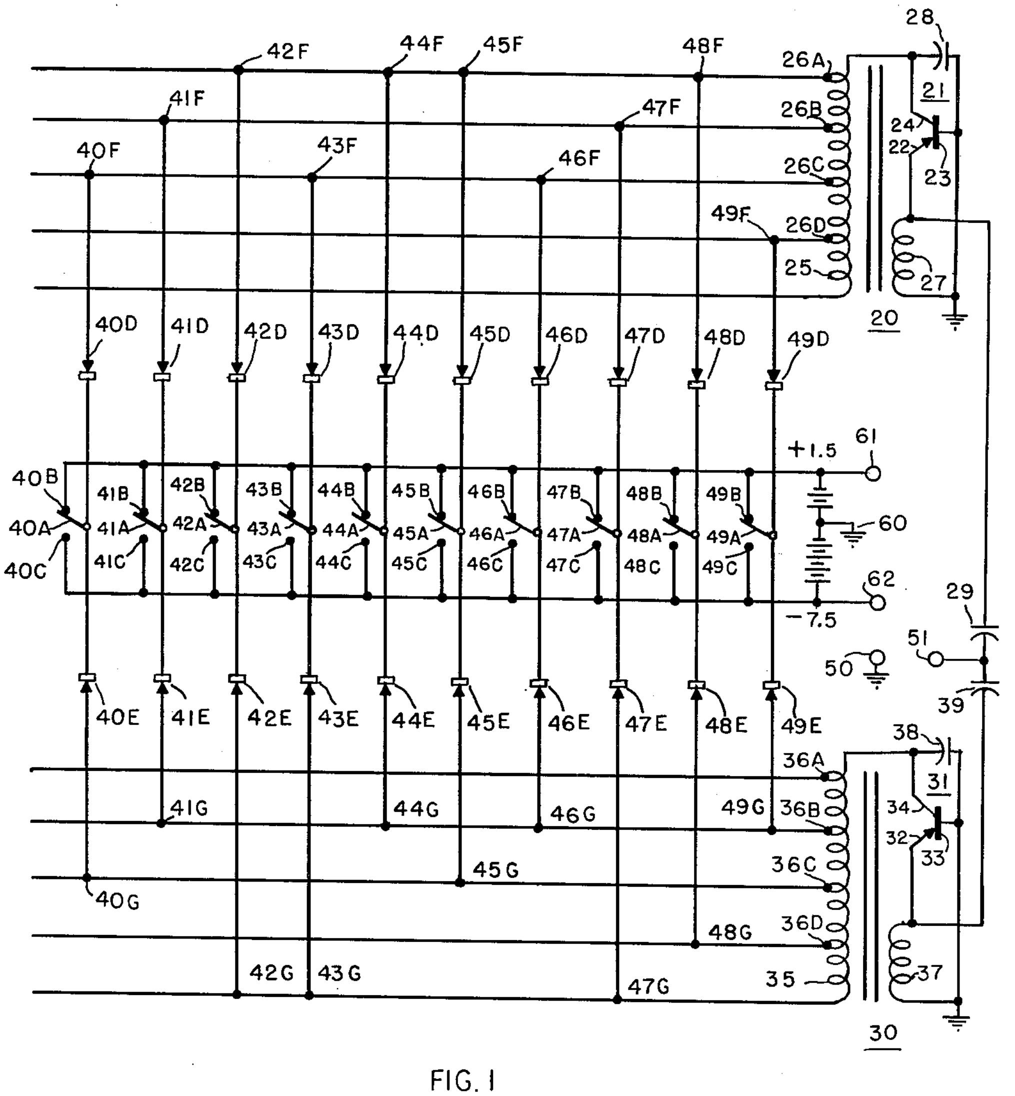
FIGURE 1 illustrates the circuit of a keysender frequency selector utilizing the principles of this invention.

Referring now more particularly to FIGURE 1, the keysender frequency selector is shown in a typical embodiment having ten keys and two oscillators to be controleld by these keys.

The keys are not shown physically, since they are not essentially to the understanding of the invention, and they would add unnecessary confusion to the figure. The keys are physically connected to the mechanical switch arms 40A through 49A. The mechanical switch arms, in their normal positions, connect the switch contacts 40B through 49B to the diodes 40D through 49E. These switch contacts apply the 1½ volt, positive back-biasing voltage of terminal 61 to the diodes.

The positive back-biasing voltage is applied to the cathode terminal of the diodes in all cases and this biasing voltage holds these diodes in a cut-off position. That is to say, each diode acts as a high impedance, and no current or signal will pass through it when its associated mechanical switch arm is in its normal position.

The anode electrodes of the diodes 40–49D each lead to one of the connections 40–49F which, in turn, lead to the one of the taps 26A–26D of the winding 25 of the oscillator 20. The anode electrodes of the diodes 40–49E each lead to one of the connections 40–49G. Each of these connections goes to one of the taps 36A–36D of the transformer winding 35 of the oscillator 30.

The back-biased diodes cut-off the connections 40–49F and the connections 40–49G from each other and from the 7½ volt source of negative energizing voltage of terminal 62. This isolation of the connections 40–49F and 40–49G permits the selection and the energization of one connection at a time which permits the choice of any desired frequency of oscillation for each of the oscillators 20 and 30 by the action of one of the switches 40–49A.

When the mechanical switch arms 40–49A are depressed, they disconnect from the positive back-biasing voltage contacts 40–49B and connect to the contacts 40–49C. These latter contacts all join the terminal 62 which connects to the minus 7½ volt, energizing voltage source.

The oscillators are conventional, and are shown in a simple form, with transistors supplying the voltage or current gain, and a transformer winding in the emitter circuit supplying the positive feedback taken from another winding, of the same transformer, which is in the collector circuit.

In the case of the oscillator 20, for example, the transistor 21 has emitter, base, and collector electrodes 22, 23, and 24 respectively. The transformer winding 25 is in the collector circuit, and supplies the positive feedback, necessary to sustain oscillations, through the other transformer winding 27 which is in the emitter circuit of the transistor. The frequency of oscillation is established by the inductance of the winding 25 and the capacity of the condenser 28.

The oscillator 30 is identical to the oscillator 20, and has its elements, that correspond to the elements of the oscillator 20, numbered similarly, but in the thirties instead of the twenties. Both oscillators have their outputs brought out, through the condensers 29 and 39 respectively, to a common output terminal 51, providing alternating voltage with respect to the ground terminal 50.

The oscillator is energized by the negative voltage supplied by the battery connected to the terminal 62 with respect to ground. This voltage must be applied through one of the switch contacts 40–49C. The negative polarity of the voltage unbiases the corresponding ones of the diodes 40–49D or E to permit the voltage to be applied through the corresponding ones of the connections 40–49F and G to the corresponding tap on each of the transformer windings.

Since the frequency of the oscillator is determined by the tuned circuit consisting of the winding 25 and the condenser 28, the frequency of the oscillator can be controlled by the transformer winding tap to which the oscillator energizing voltage is applied. This voltage is applied to a transformer winding tap through the action of one of the switch arms.

Several of the switches connect the energizing voltage to the same transformer winding tap in either of the oscillators but no two switches provide the same combination of winding taps in both oscillators. Each switch, as it is depressed, energizes both oscillators to provide a distinct combination of frequencies. Since only one switch is normally depressed at a time, only one tap of each transformer winding is energized. The other transformer winding taps remain disconnected from the source of voltage and decoupled from each other by the action of the other back-biased diodes associated with the other switches.

There are several telephone systems, as well as certain other switching systems, that can be adapted to keysender frequency switching. There is no real limit to the number of keys, or frequencies, or frequency combinations that may be employed, but there are practical limitations on the number of frequencies and frequency combinations that can be reliably utilized. This imposes a practical limit on the number of keys for which different combinations of the frequencies can be provided. In practice it is usually only necessary to provide ten keys, since that is the number of digital units now employed in telephone switching. The use of ten units in keysending would retain existing numbering systems and help maintain a certain degree of compatibility between the two systems.

The system discussed here can be used as the keysending unit of any existing system, provided that the frequencies of the various combinations are adjusted, if necessary, to conform to those of the other system. The coupling of a keysending frequency switching system into any circuit would be in accordance with well known techniques.

Figure 2:
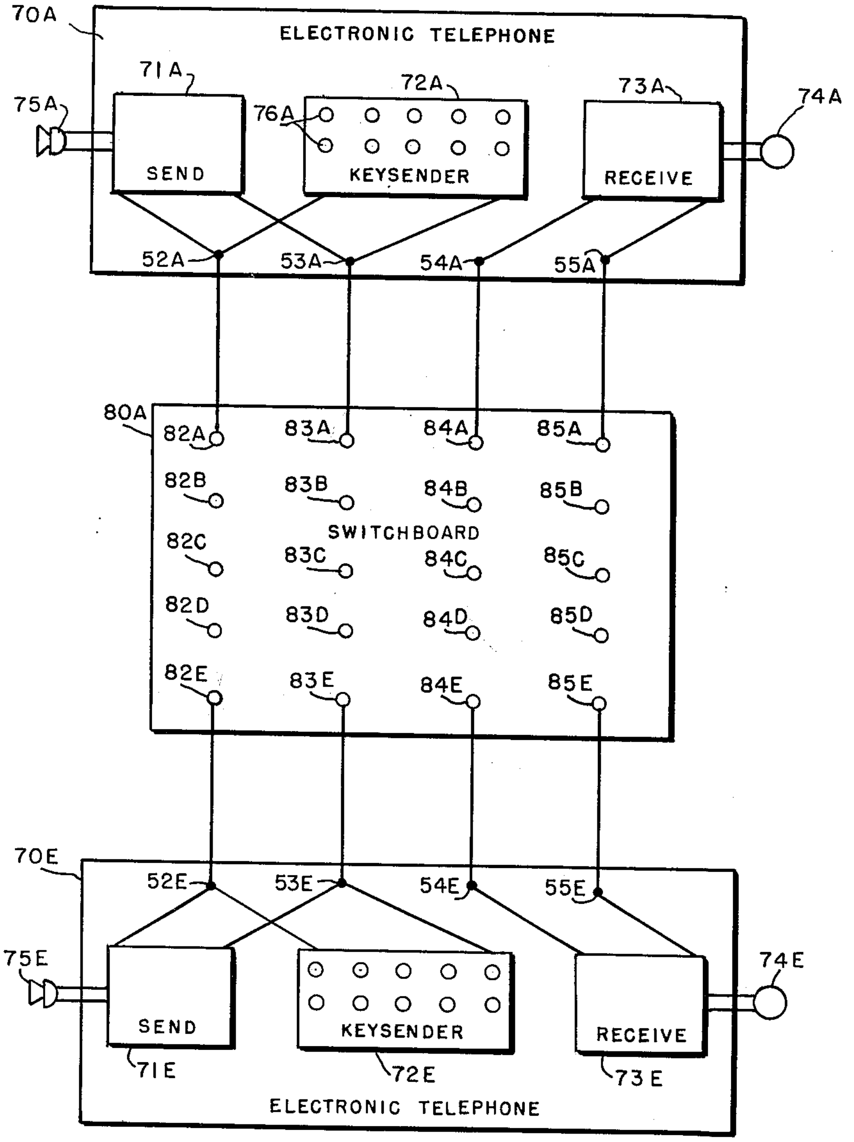
FIGURE 2 illustrates a simple telephone system that employs keysenders at each of the telephones.

One simple system that utilizes a group of keysender electronic telephones interconnected at a switchboard when required is shown in FIGURE 2. In this figure, 70A and 70E are electronic telephones utilizing keysenders. Each of these telephones includes the usual functions of sending and receiving voice signals and also the function of keysending.

In the block diagram of the electronic telephone of block 70A, for example, a microphone 75A connects to a sending unit 71A, which may include the usual amplifying means, filters, and other circuitry. The sending unit is connected to the transmitting terminals 52A and 53A. The telephone, or receiver, 74A is energized by the receiver unit 73A, which may also include amplifying means and other circuitry. The receiving unit is connected to the receiving terminals 54A and 55A.

The keysending unit 72A is shown connected to the transmitting terminals 52A and 53A. This is not the only way that the keysender data can be transmitted to the switchboard or other point at which it will be utilized, but it is the most convenient and logical way of employing the keysender in this particular system.

The keysending unit 72A may be the same type of unit illustrated in FIGURE 1, and it is shown connected to the transmitting terminals 52A and 53A. There are ten keys illustrated at 76A. These will normally be identified by numerals or letters, or both, but such details are not practical here, nor of any importance to the understanding of this system.

The transmitting terminals 52A and 53A connect, through lines, cables or conductors of types well known in the art of telegraphy, to the terminals 82A and 83A of the switchboard 80. The receiving terminals 54A and 55A are connected in the same manner to the terminals 84A and 85A.

Another electronic telephone 70E, identical to 70A is also shown. Their functions are identical, they are similarly positioned in their respective blocks, and they have corresponding numbers, including those of the transmitting terminals 52A and 53A and the receiving terminals 54E and 55E.

The transmitting and receiving terminals 52–55E of the telephone 70E are connected through conventional telephone cable to the terminals 82–85E of the switchboard in the same manner as for the telephone 70A.

Although only two telephones are shown for simplicity, it is obvious that other telephones can be similarly connected to the switchboard 80; to the other terminals shown and to the very many more that could be provided. In this particular system, the switchboard also includes other circuitry—which is not a part of this invention and is not shown for simplicity—that will receive the analog data sent by the keysenders, decode it, and connect the desired telephone circuits together.

In this particular system, the transmitting circuit of one telephone must be connected to the receiving circuit of the other telephone, and vice versa. Other systems are available that use different ways of interconnecting the telephones. Some of these systems use a common ground connection for both transmitting and receiving circuits and need fewer conductors for communication. These systems, regardless of their respective methods of decoding and utilizing the keysending data, may also employ the keysender described here as a source of analog, multi-tone, switching information.

In almost all systems employing keysenders there are very many more coded substations than there are keys or tone combinations possible. The keysending systems all utilize a series of call letters, or numbers, or both for contacting another telephone in somewhat the same way as do the digital pulse dialing systems. In both systems it is obviously necessary to dial or key the call units in the correct sequence, and in the keysending system, which permits much faster sequential calling, one must avoid depressing two keys at the same time.

What is claimed is:

1. A keysending, frequency selecting system comprising; a plurality of keys, a plurality of switching arms actuated by said keys, each of said switching arms making contact with a first electrical contact in a first position, each of said switching arms making contact with a second electrical contact in a second position, a source of voltage of one polarity with respect to ground connected to each of said first electrical contacts, a source of voltage of the other polarity with respect to ground connected to each of said second electrical contacts, a plurality of sources of oscillating electrical energy of different frequencies, means for coupling said sources of oscillating electrical energy to a common line, a plurality of diodes, each connecting one of said switching arms to one of said sources of oscillating electrical energy which is actuated when said switching arm is in said second position.

2. A keysending frequency selector for telephone switching comprising: a plurality of keys; a plurality of switching arms actuated by said keys, each of said switching arms making contact with a first electrical contact in a first position; each of said switching arms making contact with a second electrical contact in a second position; a source of voltage of one polarity with respect to ground connected to each of said first electrical contacts, a source of voltage of the other polarity with respect to ground connected to each of said second electrical contacts, a plurality of oscillators of differing frequency, a plurality of diodes associated with each of said switching arms and having one electrode connected to said switching arm, the other electrode of each of said diodes associated with each of said switching arms connected to actuate one of said oscillators of differing frequency, and means for combining the outputs of all of said oscillators of differing frequency in a common line.

3. In a keysending frequency selector for telephone switching comprising; a plurality of keys; a plurality of switching arms actuated by said keys; each of said switching arms making contact with a first electrical contact in a first position; each of said switching arms making contact with a second electrical contact in a second position; a source of voltage of one polarity with respect to ground connected to each of said first electrical contacts, a source of voltage of the other polarity with respect to ground connected to each of said second electrical contacts, a plurality of oscillators of differing frequency having outputs coupled to a common line, diode means connecting each of said switching arms to one of said oscillators, said diodes being back-biased to prevent the flow of electrical energy to said oscillators when the associated one of said switching arms is in said first position, and said diodes being forward-biased to supply energy to said oscillators when the associated one of said switching arms is in said second position.

4. A keysending frequency selector for telephone switching comprising; a plurality of keys; a plurality of switching arms actuated by said keys; each of said switching arms making contact with a first electrical contact in a first position; each of said switching arms making contact with a second electrical contact in a second position; a source of voltage of one polarity with respect to ground connected to each of said first electrical contacts; a source of voltage of the other polarity with respect to ground connected to each of said second electrical contacts; a first and second oscillator, each of said oscillators having an inductive winding forming part of its tuned circuit; each of said inductive windings having a plurality of taps, the connection of each of said taps to a source of voltage causing said oscillator to oscillate at a different frequency; diode means for coupling each of said switching arms to one of said taps of each of said oscillators; said diodes being polarized to be back-biased by the voltage from said first electrical contact when said switch arm is in said first position, and to be forward-biased to apply the voltage from said second electrical contacts to said taps to cause said oscillators to oscillate when said switching arm is in said second position, and means for combining the outputs of said first and second oscillators in a common line.

References Cited in the file of this patent

UNITED STATES PATENTS

| | | |
|---|---|---|
| 2,542,592 | Styren | Feb. 20, 1951 |
| 2,966,659 | Dahlbom et al. | Dec. 27, 1960 |